US012580653B2

(12) United States Patent
Simon et al.

(10) Patent No.: US 12,580,653 B2
(45) Date of Patent: Mar. 17, 2026

(54) METHOD FOR EQUALIZATION IN AN ACCESS NETWORK OF PASSIVE OPTICAL NETWORK TYPE, COMPUTER PROGRAM PRODUCT, OPTICAL LINE TERMINATION AND OPTICAL NETWORK UNIT CORRESPONDING THERETO

(71) Applicant: ORANGE, Issy-les-Moulineaux (FR)

(72) Inventors: Gael Simon, Châtillon Cedex (FR); Philippe Chanclou, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 256 days.

(21) Appl. No.: 18/250,431

(22) PCT Filed: Oct. 25, 2021

(86) PCT No.: PCT/FR2021/051867
§ 371 (c)(1),
(2) Date: Apr. 25, 2023

(87) PCT Pub. No.: WO2022/090657
PCT Pub. Date: May 5, 2022

(65) Prior Publication Data
US 2023/0403076 A1 Dec. 14, 2023

(30) Foreign Application Priority Data
Oct. 26, 2020 (FR) ...................................... 2010960

(51) Int. Cl.
*H04B 10/2507* (2013.01)
*H04J 14/02* (2006.01)
(52) U.S. Cl.
CPC .. *H04B 10/25073* (2013.01); *H04J 14/02216* (2023.08); *H04J 14/0275* (2013.01)

(58) Field of Classification Search
CPC .......... H04B 10/25073; H04J 14/02216; H04J 14/0275; H04J 14/0227
See application file for complete search history.

(56) References Cited

FOREIGN PATENT DOCUMENTS

| CA | 2963504 C | * 9/2019 | ......... H04B 10/2507 |
| CN | 101860401 B | 12/2012 | |

OTHER PUBLICATIONS

International Search Report dated Feb. 16, 2022 for corresponding International Application No. PCT/FR2021/051867, filed Oct. 25, 2021.

(Continued)

*Primary Examiner* — Leslie C Pascal
(74) *Attorney, Agent, or Firm* — David D. Brush; Westman, Champlin & Koehler, P.A.

(57) ABSTRACT

A method for equalization in an access network of passive optical network type. The method includes, for a given optical distribution network connecting a given input port of an optical line termination to a given plurality of optical network units: for at least one of the optical network units of the given plurality, obtaining a distance between the optical line termination and the optical network unit; determining a representative distance associated with the given optical distribution network, according to the one or more distances obtained; determining at least one equalization parameter, according to the representative distance; and equalizing transmission channels within the given optical distribution network, according to the at least one equalization parameter, each of the transmission channels connecting the given port of the optical line termination to one of the optical network units of the given plurality.

9 Claims, 6 Drawing Sheets

(56) References Cited

OTHER PUBLICATIONS

Written Opinion of the International Searching Authority dated Feb. 16, 2022 for corresponding International Application No. PCT/FR2021/051867, filed Oct. 25, 2021.

Chou Elaine S et al., "Adaptive Coding and Modulation for Robust Optical Access Networks", Dec. 31, 2019 (Dec. 31, 2019), vol. 38, No. 8, p. 2242-2252, XP011782242.

"TR-280 ITU-T PON in the context of TR-178," broadband forum Technical Report, Issue: 1, Issue Date: Oct. 2016.

"Equalization," equation 3.313, Chapter 3, pp. 437-629, https://cioffi-group.stanford.edu/doc/book/chap3.pdf.

Wang S. G. et al., "Temperature Buried Dependence of the Bandwidth of Heterostructure Distributed Feedback Lasers," IEEE Photonics Technology Letters, vol. 1, No. 9, Sep. 1989, doi: 10.1109/68.43338.

English translation of the Written Opinion of the International Searching Authority dated Feb. 16, 2022 for corresponding International Application No. PCT/FR2021/051867, filed Oct. 25, 2021.

* cited by examiner

Obtain distance between equipment OLT and equipment ONU                    41

Determine representative distance associated with the given network ODN    42

Determine set of equalization parameters                                   43

Equalize main transmission channels included in the given network ODN      44

Memorize the set of transmission parameter(s) for another subsequent sharing    45

METHOD FOR EQUALIZATION IN AN ACCESS NETWORK OF PASSIVE OPTICAL NETWORK TYPE, COMPUTER PROGRAM PRODUCT, OPTICAL LINE TERMINATION AND OPTICAL NETWORK UNIT CORRESPONDING THERETO

CROSS-REFERENCE TO RELATED APPLICATIONS

This Application is a Section 371 National Stage Application of International Application No. PCT/FR2021/051867, filed Oct. 25, 2021, which is incorporated by reference in its entirety and published as WO 2022/090657 A1 on May 5, 2022, not in English.

1. TECHNICAL FIELD

The field of the invention is that of optical telecommunications (optical fiber) and access networks of the "passive optical network" type (PON, "Passive Optical Network").

More specifically, the invention relates to a method (and different corresponding devices) for equalization within such a PON network.

A passive optical network (PON) refers to a level 1 optical fiber transport principle used in optical service networks (FTTx, "Fiber To The x"). It is characterized by a passive point-to-multipoint fiber architecture (several users share the same optical fiber and there is no active equipment between the central office and the subscribers). There are different PON network standards, including GPON (ITU-T G.984 standard), XGS-PON (ITU-T G.9807 standard), NG-PON2 (ITU-T G.989 standard), HS-PON (ITU-T G.9804 standard), etc.

2. TECHNOLOGICAL BACKGROUND

As illustrated in FIG. 1, a PON network comprises optical line termination (OLT, "Optical Line Termination") piece of equipment that is connected to optical network units (ONU) via one or more point-to-multipoint type optical distribution network(s) (ODN, "optical distribution network") (also called "PON tree(s)").

The equipment OLT is the termination equipment, on the network side, ensuring the interface with the fibers of one or more network(s) ODN. In France, it is generally located in the optical connection node (NRO). Conventionally, it has a frame with cards each including optical ports. Each of these optical ports addresses several dozen clients throughout a distinct network ODN. For example, a piece of equipment OLT can aggregate several hundred optical ports, and therefore several thousand ONUs.

Each optical network unit (ONU) ensures the user-side interface. It converts the optical signals received by fiber into electrical signals which are sent afterwards to individual subscribers. It is also sometimes called "optical network termination" (ONT, "Optical Network Termination").

Each optical distribution network (ODN) provides the optical transmission medium for the physical connection of a plurality of optical network units (ONU) to the equipment OLT, with a range for example limited to 20 km.

Hence, a given network ODN comprises a plurality of transmission channels, each connecting the given port of the equipment OLT to one of the pieces of equipment ONU of the given plurality, either in the downlink direction (referenced "D" in FIG. 1 for "downlink", i.e. "OLT to ONU") or in the uplink direction (referenced "U" in FIG. 1 for "uplink", i.e. "ONU to OLT").

The rise in bitrate in the PON access network (for example with line bitrates higher than 10 Gbit/s) increasingly tightens the constraints on the different components of the signal transmission chain (laser emitter, optical channel, receiver photodiode, transimpedance amplifier), whether in the downlink direction (from the equipment OLT down to the equipment ONU) or in the uplink direction (from the equipment ONU up to the equipment OLT). The bandwidth (frequency) limitations of the different components impose carrying out an equalization allowing compensating for the distortion undergone by the transmission chain.

To illustrate this need to perform equalization, FIG. 2 illustrates an example of a PON network without equalization and FIG. 3 illustrates an example of a PON network with ideal equalization. As example, consider FIGS. 2 and 3 in the case of a channel in the downlink direction (but the problem is the same in the uplink direction). In FIG. 2, the optical emitter T (laser emitter for example) included in the equipment OLT receives an input signal to be transmitted, which is for example a stream of bits in the NRZ format and at a rate of 50 Gb/s, whose temporal representation is referenced 21$b$ and the spectral representation is referenced 21$a$ (with a main lobe and secondary lobes). The bandwidth of the emitter is limited (for example to about 40 GHz), as illustrated by the curve referenced 22. The network ODN comprises an optical channel OC connecting, in the downlink direction ("downlink"), the emitter T located in the equipment OLT and the receiver R located in the equipment ONU, and having a fading whose frequency position depends on the chromatic dispersion (which itself depends on the wavelength), the chirp and the OLT/ONU distance (i.e. the length of the fiber transmission line). The curve referenced 23 illustrates this fading. The optical receiver R (photodiode for example) included in the equipment ONU receives the signal at the output of the optical channel OC and generates an output signal. The bandwidth of the receiver is limited, as illustrated by the curve referenced 24. The output signal undergoes a distortion with respect to the input signal (21$a$, 21$b$), as shown in the temporal representation referenced 25$b$ and the spectral representation referenced 25$a$ (the secondary lobes are hatched) of the output signal. Hence, it is necessary to compensate for the limited bandwidth of the emitter T, the limited bandwidth of the receiver R, as well as the fading of the optical channel OC. Ideally, and as illustrated in FIG. 3, this equalization is carried out by completing the PON network of FIG. 2 with a pre-compensation element (referenced "Pre-C" and carrying out a pre-compensation whose frequency representation is referenced 31), included in the equipment OLT (upstream of the emitter) and/or a post-compensation element (referenced "Post-C" and carrying out a post-compensation whose frequency representation is referenced 32), included in the equipment ONU (downstream of the receiver). Thus, the output signal is substantially identical to the input signal, as shown in the temporal representation referenced 33$b$ and the spectral representation referenced 33$a$ (the secondary lobes are no longer hatched) of the output signal.

In practice, this equalization (compensation) is all the more complex to implement as the characteristics of the transmission chain are not known a priori. For example, if the equalization is performed by an element located on the emitter side (case of pre-compensation on the equipment OLT side), this element should pre-compensate the unknown distortion introduced by the optical channel and the receiver (equipment ONU side). An equalization may also be performed by an element located on the receiver side (case of a post-compensation on the equipment ONU side).

The fact that the infrastructure of the network ODN is shared and that the OLT/ONU distances (i.e. the distances between the equipment OLT and the different pieces of equipment ONU) are conventionally specified in ranges (classes) (for example: 0-20 km) further complicates the problem of equalization, and nowadays makes the implementation of this equalization barely (or not) realistic. For example, in the case of a pre-compensation type equalization, the emitter in the equipment OLT should be ready to compensate for all possible transmission channels of the different networks ODN (PON trees), in the range of specified OLT/ONU distances (for example: 0-20 km).

The current difficulty in implementing equalization in a PON network is now detailed through an example.

The point-to-multipoint nature of the PON network as well as its extensive use (millions of clients) implies a wide variety of OLT/ONU distances and therefore a wide variety of transmission channels. Earlier generations of networks PON (including G-PON, XGS-PON and NG-PON2) so far provide for interoperability for a transmission channel with a distance comprised in a range of 0-20 km (i.e. say which can be between 0 and 20 km, without pre-knowledge). Considering a HS-PON type access network, the practical implementation of an equalization element (typically in the form of an equalization module executed on a digital signal processor (DSP, "Digital Signal Processor"), for example like an FFE ("Feed-Forward Equalization") module, a DFE ("Decision Feedback Equalization") module, a CTLE ("Continuous Time Linear Equalization") module, etc.) in the transmission chain encounters implementation limitations.

Indeed, an FFE equalization module, for example, is characterized by its number of "cursors" (also called "coefficients" or "taps") used to define its impulse response, as well as by the time interval separating these cursors. The greater the number of cursors, the more the equalization capacity will be adapted to the variety of considered channels. Similarly, the shorter the time interval, the more the equalization module will allow compensating for spectrally wide channels.

Yet, the use of these techniques in a HS-PON type PON network, with bitrates of NRZ (therefore spectrally wide) imposes strong constraints on the time interval required by the equalization element (typically 10 ps; i.e. T/2 with T: symbol time (=$\frac{1}{50}$ GHz in 50 Gb/s)). The state of the art of current equalization modules restricts the number of cursors typically to ten for such a short time interval. This limitation in the number of cursors prevents correct equalization of all transmission channels in the 0-20 km range.

Hence, there is a need to provide a solution allowing facilitating the implementation of an equalization in a PON network type access network. Another objective is that this solution be simple to implement and inexpensive.

3. SUMMARY

In a particular embodiment of the invention, a method for equalization in a passive optical network (PON) type access network is provided, comprising the following steps, for a given optical distribution network (ODN) connecting a given port of an optical line termination (OLT) to a given plurality of optical network units (ONU):

for at least one of the optical network units (ONU) of the given plurality, obtaining a distance between the optical line termination (OLT) and said optical network unit (ONU);

determining a representative distance associated with the given optical distribution network (ODN), according to the obtained distance(s);

determining at least one equalization parameter, according to the representative distance; and equalizing transmission channels within the given optical distribution network (ODN), according to said at least one equalization parameter, each of the transmission channels connecting the given port of the optical line termination (OLT) to one of the optical network units (ONU) of the given plurality.

Thus, the proposed solution is based on an approach consisting in performing the equalization of a PON network based not on a range of possible OLT/ONU distances (typically: 0-20 km) but only on one or more OLT/ONU distances of a given network ODN. There is no equalization that is common to all networks ODN, but one equalization per network ODN. In other words, each network ODN can be subjected to a separate equalization, which depends on the fiber infrastructure actually existing in this network ODN (i.e., depending in particular on the OLT/ONU distance obtained for at least one piece of equipment ONU connected to this network ODN).

Hence, the proposed solution facilitates the implementation of an equalization in a PON network. Indeed, for a given network ODN, the OLT/ONU distance constraint is much weaker than with the conventional solution based on a range of possible OLT/ONU distances (typically: 0-20 km). In other words, to the extent that each network ODN (sometimes also called "PON tree") generally connects only a few dozen pieces of equipment ONU to the equipment OLT, and that these pieces of equipment ONU are generally co-located, this considerably simplifies the problem of implementing the equalization. For example, if the equipment ONU of the considered network ODN (PON tree) is distributed on average at 17 km+/−1 km from the equipment OLT, the equalization parameters will be adapted to this distance (and not to the range of possible OLT/ONU distances, typically equal to 0-20 km). The equalization applied to a neighboring network ODN (neighboring PON tree), even though it is managed by the same card of the equipment OLT (but by another optical port), could have different equalization parameters.

In this manner, it becomes possible to implement an equalization in a given network ODN, even though this given network ODN is part of a HS-PON type access network, with data rates of 50 Gb/s NRZ.

According to a particular feature, the step of obtaining a distance is performed for each of the optical network units (ONU) of the given plurality, and in that the determination of the representative distance depends on the distances obtained for said optical network units (ONU) of the given plurality.

Thus, the determination of the representative distance associated with the considered optical distribution network (ODN) is improved. As specified hereinafter, there are several manners for determining the representative distance according to the OLT/ONU distances.

According to a first particular implementation, the obtainment of a distance for a given optical network unit (ONU) results from a sharing of a set of transmission parameter(s) including said distance, between the optical line termination (OLT) and the given optical network unit (ONU), via another transmission channel which is established before said transmission channel is established connecting the given port of the optical line termination (OLT) to the given optical network unit (ONU).

In this first implementation, the obtainment of an OLT/ONU distance is performed thanks to another transmission channel (for example a low bitrate one) between the two considered pieces of equipment (OLT and ONU). Hence, this first implementation is simple and inexpensive.

According to a second particular implementation, the obtainment of a distance for a given optical network unit (ONU) results from a sharing of a set of transmission parameter(s) including said distance, between the optical line termination (OLT) and another optical line termination of a different generation, and also connected to said optical distribution network (ODN).

In this second implementation, the obtainment of an OLT/ONU distance is performed thanks to a sharing of parameter(s) between the optical line termination (OLT) and another optical line termination, of a different generation. Hence, sharing is performed during a migration to a new generation of optical line termination (OLT), for the given network ODN (which remains the same). For example, this involves a migration from a XGSPON-type piece of equipment OLT to a HSPON-type piece of equipment OLT. Hence, this second implementation is also simple and inexpensive.

According to a particular feature, said set of transmission parameter(s) includes at least one other transmission parameter of a transmission chain between the optical line termination (OLT) and said given optical network unit (ONU), distinct from the distance between the optical line termination (OLT) and said given optical network unit (ONU), and in that the determination of said at least one equalization parameter also depends on said at least one other transmission parameter.

Thus, by taking into account at least one other transmission parameter (other than the OLT/ONU distance) for each OLT/ONU pair, the quality of the equalization in the considered network ODN is further improved.

According to one particular feature, said at least one other transmission parameter belongs to the group comprising:

a temperature, of the optical line termination (OLT) or of the optical network unit (ONU);

an optical power emitted by an emitter included in the optical line termination (OLT) or the optical network unit (ONU);

an optical power received by a receiver included in the optical line termination (OLT) or the optical network unit (ONU);

a bias current within an emitter included in the optical line termination (OLT) or the optical network unit (ONU); and a modulation voltage within an emitter included in the optical line termination (OLT) or the optical network unit (ONU).

This list of transmission parameters is not exhaustive.

According to a particular feature, the method comprises a step of memorizing in the optical line termination (OLT), or of emitting towards a device capable of memorizing, said set of transmission parameter(s) or of parameters that are representative thereof, for another subsequent sharing.

Thus, the set of transmission parameter(s) which is memorized (or parameters that are representative thereof) can be used to perform another subsequent sharing (for example, during a migration to still another optical line termination of still another generation).

According to a particular feature, the equalization comprises at least one equalization type belonging to the group comprising:

a pre-compensation type equalization, performed in the optical line termination (OLT) and applying for a downlink direction, from the optical line termination (OLT) towards the given plurality of optical network units (ONU);

a post-compensation type equalization, performed in at least one of the optical network units (ONU) and applying for a downlink direction, from the optical line termination (OLT) towards said optical network unit (ONU);

a pre-compensation type equalization, performed in the optical line termination (OLT) and applying for an uplink direction, from one of the optical network units (ONU) towards the optical line termination (OLT); and a post-compensation type equalization, performed in at least one of the optical network units (ONU) and applied for an uplink direction, from said optical network unit (ONU) towards the optical line termination (OLT).

Thus, the proposed solution is compatible with all possible cases of equalization: equalization by pre- and/or post-compensation whether for the downlink direction ("OLT to ONU") or for the uplink direction ("ONU to OLT").

The different aspects of the equalization method that have just been described can be implemented independently of each other or in combination with each other.

In another embodiment of the invention, a computer program product is provided which comprises program code instructions for the implementation of the aforementioned method (in any one of its different embodiments), when said program is executed on a computing machine (computer, processor, etc.).

In another embodiment of the invention, a computer-readable and non-transitory storage medium is provided storing a computer program comprising a set of instructions executable by a computing machine (computer, processor, etc.) to implement the aforementioned method (in any one of its different embodiments).

In another embodiment of the invention, an optical line termination (OLT) of a passive optical network (PON) type access network is provided, characterized in that it comprises, for a given optical distribution network (ODN) connecting a given port of said optical line termination (OLT) to a given plurality of optical network units (ONU):

means for obtaining, for at least one of the optical network units (ONU) of the given plurality, a distance between the optical line termination (OLT) and said optical network unit (ONU);

means for determining a representative distance associated with the given optical distribution network (ODN), according to the obtained distance(s);

means for determining at least one equalization parameter, according to the representative distance; and means for equalizing transmission channels within the given optical distribution network (ODN), according to said at least one equalization parameter, each of the transmission channels connecting the given port of the optical line termination (OLT) to one of the optical network units (ONU) of the given plurality.

In all embodiments thereof, this optical line termination (OLT) is able to implement the equalization method that has just been described.

In another embodiment of the invention, an optical network unit (ONU) of a passive optical network (PON) type access network is provided, comprising, for a given optical distribution network (ODN) connecting a given port of an optical line termination (OLT) to a given plurality of optical network units (ONU) including said optical network unit (ONU):

means for obtaining, at least for said optical network unit (ONU), a distance between the optical line termination (OLT) and said optical network unit (ONU);

means for determining a representative distance associated with the given optical distribution network (ODN), according to the obtained distance(s);

means for determining at least one equalization parameter, according to the representative distance; and means for equalizing, according to said at least one equalization parameter, the transmission channel connecting the given port of the optical line termination (OLT) to said optical network unit (ONU).

In all embodiments thereof, this optical network unit (ONU) is able to implement the equalization method that has just been described.

4. LIST OF THE FIGURES

Other features and advantages of the invention will appear upon reading the following description, given as an indicative and non-limiting example, and from the appended drawings, wherein:

FIG. 1, already described in relation to the prior art, illustrates components of a PON network;

FIG. 2, already described in relation to the prior art, illustrates an example of a PON network without equalization;

FIG. 3, already described in relation to the prior art, illustrates an example of a PON network with ideal equalization;

5. DETAILED DESCRIPTION

Figure 1:
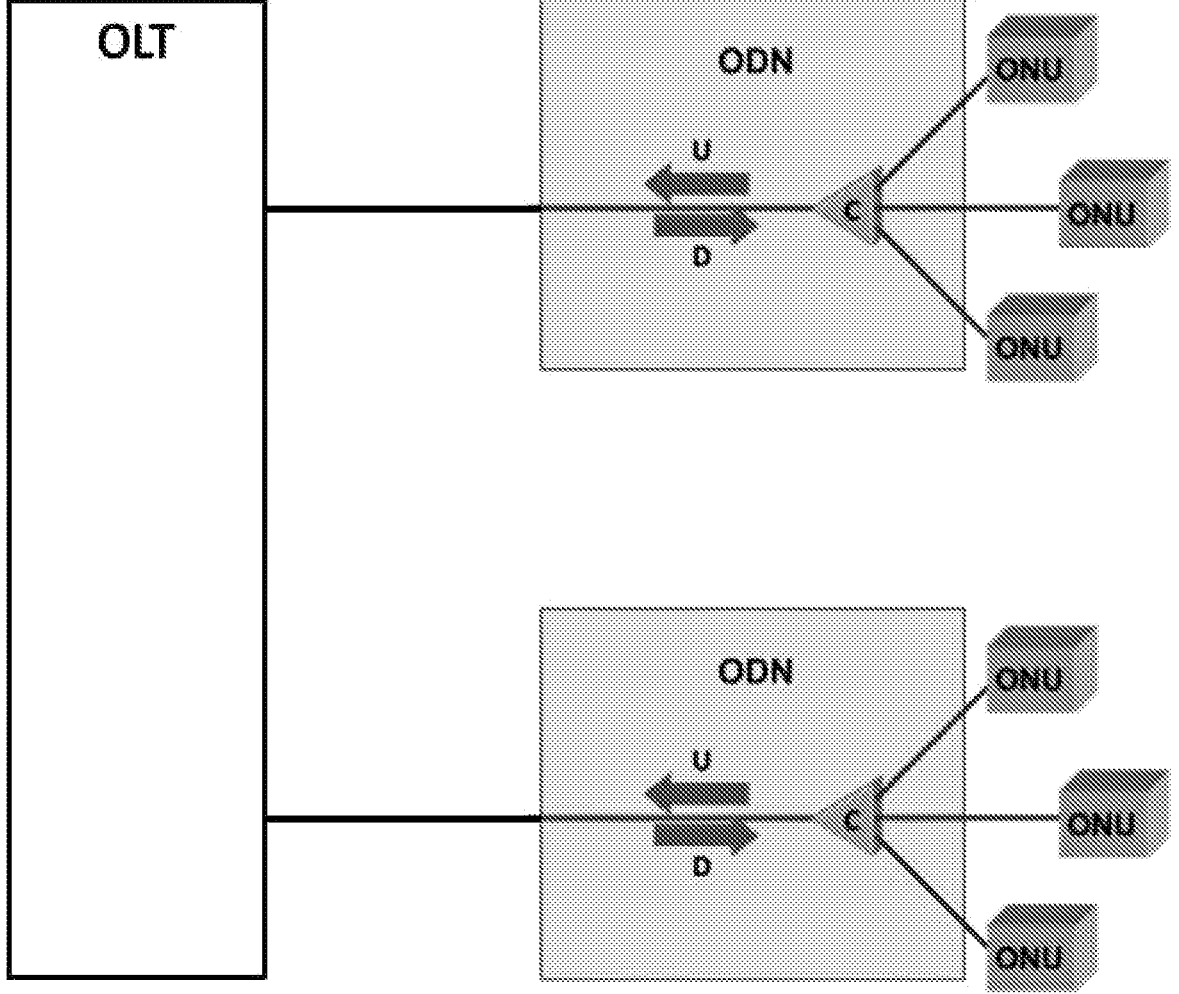
Figures 2, 3:
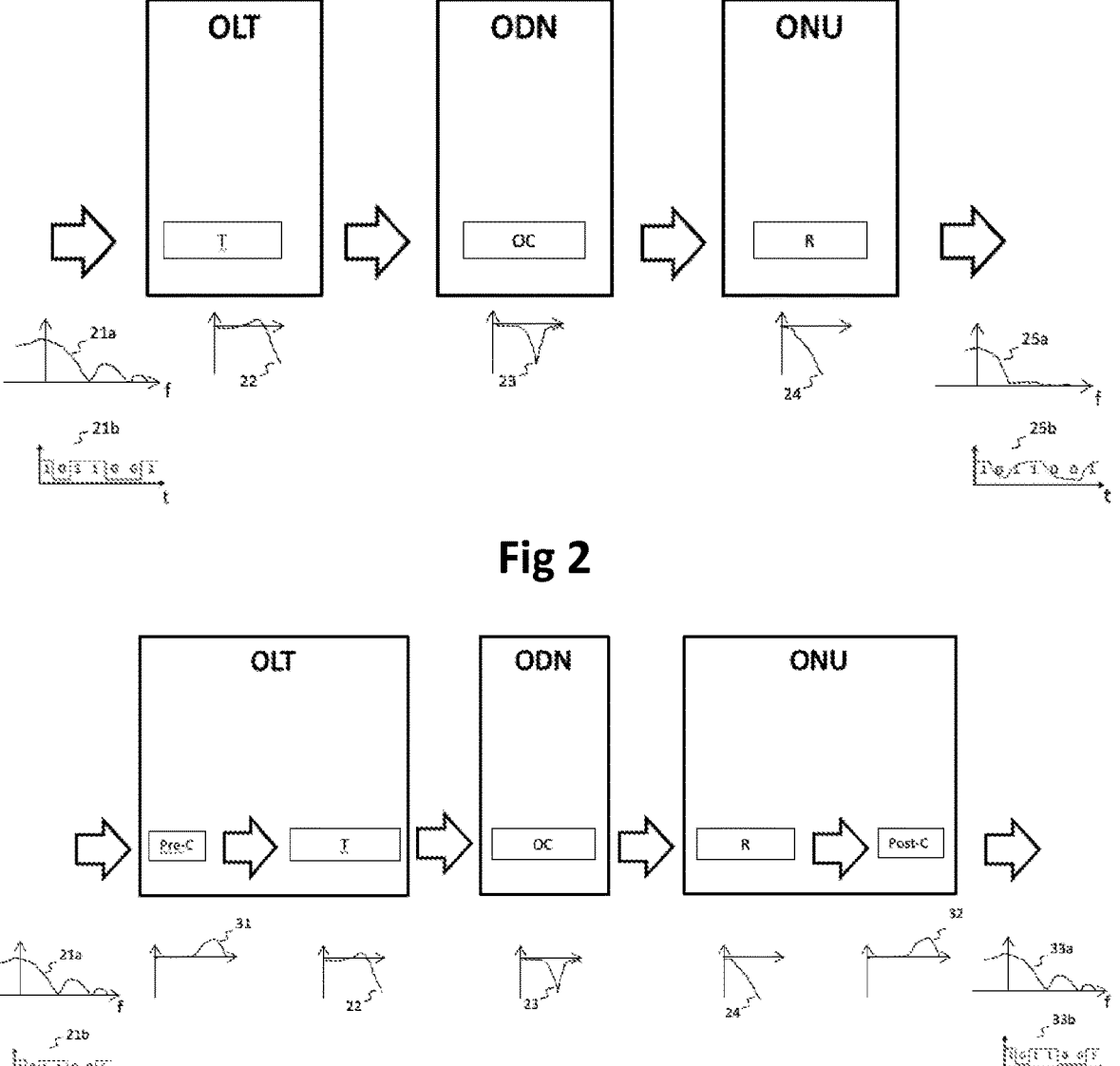

In all figures of the present document, identical elements and steps bear the same reference numeral.

Figure 4:
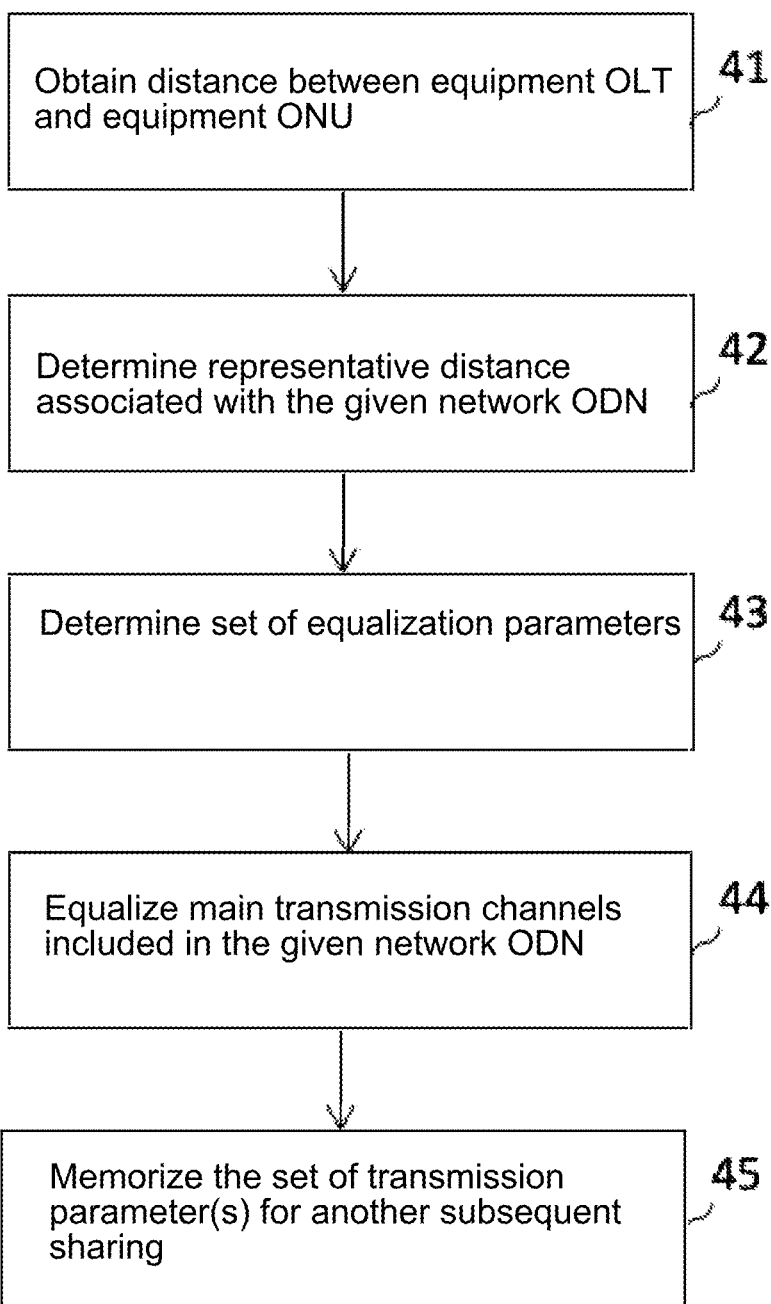
FIG. 4 shows a flowchart of a particular embodiment of the equalization method according to the invention.

Referring to FIG. 4, a method for equalization in a PON network is now disclosed according to an embodiment of the invention. A given network ODN is considered, connecting a given port of a piece of equipment OLT to a given plurality of pieces of equipment ONU. Hence, the given network ODN comprises a plurality of transmission channels (hereinafter called "main transmission channels"), each connecting the given port of the equipment OLT to one of the pieces of equipment ONU of the given plurality, either in the downlink direction ("downlink", i.e. "OLT to ONU") or in the uplink direction ("uplink", i.e. "ONU to OLT").

For example, the steps of the method are executed by a first computing machine included in the equipment OLT, or by a second computing machine included in each of the pieces of equipment ONU (or in at least some of the pieces of equipment ONU), or by both of the aforementioned first and second computing machines. An embodiment of such a (first or second) computing machine is detailed hereinbelow with reference to FIG. 6.

Step 41

In a step 41, for at least one of the pieces of equipment ONU of the given plurality, a distance between the equipment OLT and this equipment ONU is obtained, hereinafter called "OLT/ONU distance". In a particular embodiment, an OLT/ONU distance is obtained for each of the pieces of equipment ONU of the given plurality.

In a first implementation of step 41, the obtainment of an OLT/ONU distance for a given equipment ONU results from a sharing, between the equipment OLT and the given equipment ONU, of a set of transmission parameter(s) (including the OLT/ONU distance). This sharing is performed via another transmission channel (for example a low bitrate one), hereinafter called "secondary transmission channel", which is established before the main transmission channel (the high bitrate one) connecting the given port of the equipment OLT to the given equipment ONU.

Figure 7:
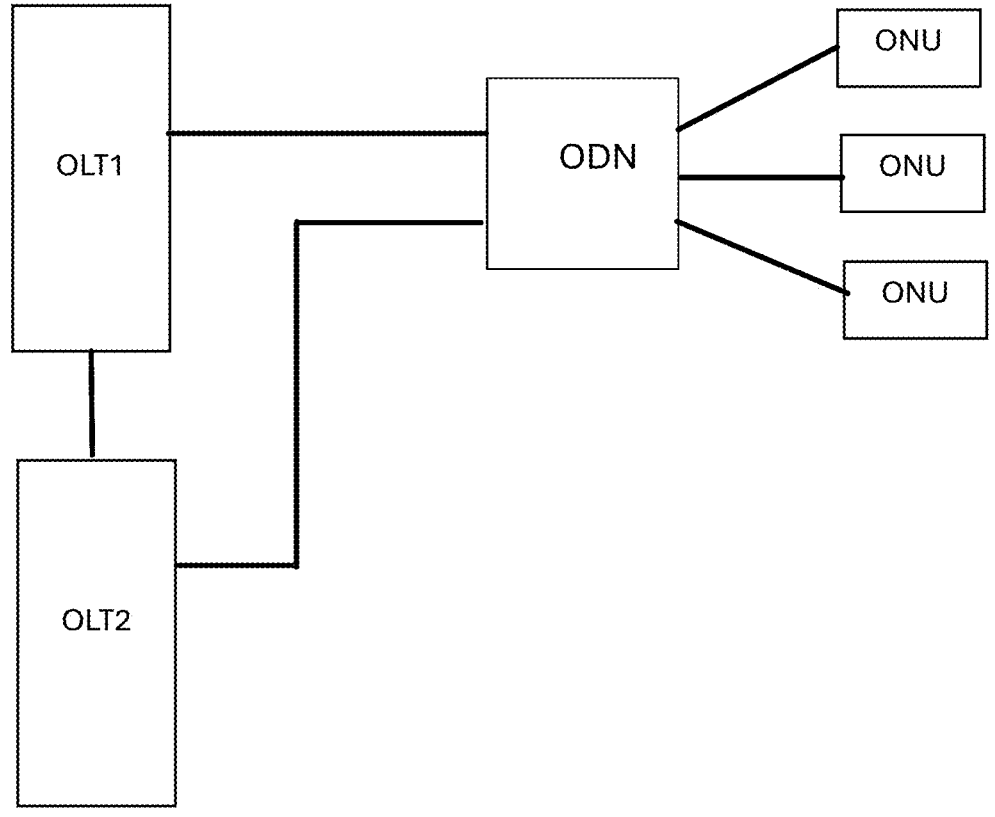
FIG. 7 is a block diagram showing sharing between an optical line termination OLT and another optical line termination OLT of a different generation and using the same given network ODN.

In a second implementation of step 41, shown in FIG. 7, the obtainment of an OLT/ONU distance for a given piece of equipment ONU results from a sharing between the equipment OLT1 and another equipment OLT2 of a different generation and using the same given network ODN. Sharing covers a set of transmission parameter(s) (including the OLT/ONU distance). This sharing is performed via a communication interface between the two pieces of equipment OLT1 and OLT2 of different generations. In other words, the knowledge of the set of transmission parameter(s) may also be inherited, following a technology migration between two pieces of equipment OLT of different generations (for example a migration from a G-PON type piece of equipment OLT to a HS-PON type piece of equipment OLT). Cf. hereinafter for a more detailed presentation of such a technology migration.

In a variant of the first or second implementation of step 41, the set of transmission parameter(s) (shared between the equipment OLT and the given equipment ONU) is not limited to the OLT/ONU distance and includes at least one other transmission parameter, relating to the transmission chain between the equipment OLT and the given equipment ONU (either in the downlink direction ("OLT to ONU") or in the uplink direction ("ONU to OLT"). For example, this transmission chain comprises the following elements: optical emitter (laser), optical channel, optical receiver (receiver photodiode), transimpedance amplifier, etc.

By transmission parameter, it should be understood in particular, but not exclusively:

a temperature, of the equipment OLT or of the equipment ONU;

an optical power emitted by an emitter included in the equipment OLT or the equipment ONU;

an optical power received by a receiver included in the equipment OLT or the equipment ONU;

a bias current within an emitter included in the equipment OLT or the equipment ONU;

a modulation voltage within an emitter included in the equipment OLT or the equipment ONU;

. . .

Step 42

In a step 42, a representative distance associated with the given network ODN is determined, according to the obtained OLT/ONU distance(s). For this determination, different types of calculations are possible: average, standard deviation, disparity, etc. In the particular embodiment where an OLT/ONU distance is obtained for each of the pieces of equipment ONU of the given plurality, the determination of the representative distance depends on all of the obtained OLT/ONU distances.

In step 42, advantage is taken of the fact that in practice, for a considered network ODN, the OLT/ONU distances are centered and the disparity of OLT/ONU distances (i.e. the difference between the OLT/ONU distance for the farthest equipment ONU and the OLT/ONU distance for the nearest equipment ONU) is relatively small (<1 km on average to date).

Step 43

In a step 43, a set of equalization parameters (also called hereinafter "cursors", "coefficients" or "taps") is determined according to the representative distance. The equalization parameters may be pre-established by an abacus (in this case, the abacus allows obtaining the equalization parameters, knowing the representative distance). Alternatively, the equalization parameters are calculated on the fly (i.e. dynamically).

For example, if the equipment ONU of the considered network ODN (PON tree) is distributed on average at 17 km+/−1 km from the equipment OLT (which constitutes the aforementioned "representative distance"), the equalization parameters will be adapted to this representative distance (and not to the range of possible OLT/ONU distances, typically equal to 0-20 km).

In a variant of step 43, if the set of transmission parameter(s) (exchanged at step 41) includes at least one other transmission parameter, the determination of the at least one equalization parameter also depends on this (these) other transmission parameter(s). Indeed, the other transmission parameters affect the physical parameters of the transmission. For example, increasing the temperature of the laser emitter results in a reduction in the bandwidth. This reduction in the bandwidth of the laser emitter results in a reduction in the overall transfer function of the system (the overall transfer function being the product of the transfer functions of the emitter, the channel and the receiver).

Step 44

In a step 44, an equalization of the main transmission channels included in the given network ODN is performed, according to the equalization parameter(s). The equalization comprises a pre-compensation type equalization (performed by an equalization element included in the equipment OLT) and/or a post-compensation type equalization (performed by an equalization element included in each—or at least one—of the pieces of equipment ONU). Equalization by pre- and/or post-compensation is performed either for the down-link direction ("OLT to ONU") or for the uplink direction ("ONU to OLT").

For example, an equalization module of the FFE, DFE, CTLE, etc. type, executed on a DSP processor, is used. As already mentioned hereinabove, an FFE equalization module is characterized by its number of "cursors" (also called "coefficients" or "taps") used to define its impulse response, as well as by the time interval separating these cursors. The greater the number of cursors, the more the equalization capacity will be adapted to the variety of considered channels. Similarly, the shorter the time interval, the more the equalization module will allow compensating for spectrally wide channels. The use of an FFE equalization module in a HS-PON type PON network, with bitrates of 50 Gb/s NRZ (therefore spectrally wide) imposes strong constraints on the time interval necessary for the equalization (typically 10 ps; namely T/2 with T: symbol time (=1/50 GHz in 50 Gb/s)).

In the prior art, for such a short time interval, the equalization elements whose financial cost is reasonable include only a small number of cursors (typically about ten). This limitation of the number of cursors prevents a correct equalization of all of the possible transmission channels within the 0-20 km range.

With the proposed solution, this limitation of the number of cursors does not prevent performing a suitable equalization since this equalization does not apply to all possible transmission channels in the 0-20 km range, but only to the transmission channels actually existing in the considered network ODN (and whose OLT/ONU distance is equal to, or approximated by, the representative distance determined at step 42 and associated with this considered network ODN).

With the proposed solution, the method for obtaining the cursors (coefficients or taps) in step 43, is for example as follows: once the transmission channels to be equalized have been estimated based on the ONU/OLT distances (and possibly the other transmission parameters), these channels are averaged (different types of calculations are possible: average, standard deviation, disparity, etc.). This results in a global channel having characteristics representative of all of the ONU/OLT links (in particular a representative OLT/ONU distance). The impulse response of this global channel is extracted (by inverse Fourier transform) and used to calculate the optimal parameters of the equalization element (i.e. the aforementioned sliders/coefficients/taps), as described for example by CIOFFI (cf. "https://cioffi-group-.stanford.edu/doc/book/chap3.pdf", equation 3.313).

Step 45

In a particular implementation, a step 45 allows performing a memorization in the equipment OLT, or an emission to a device able to memorize, the set of transmission parameter(s) (or parameters that are representative thereof) for another subsequent sharing.

Figure 5A:
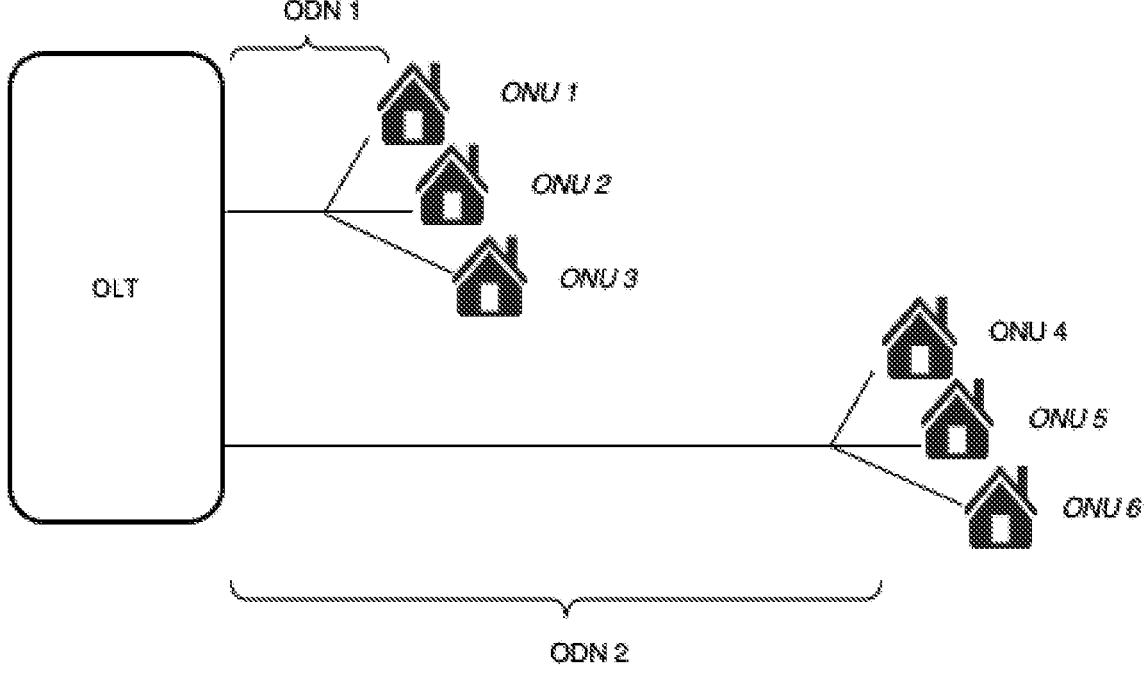
FIG. 5A shows an example of a PON network comprising first and second networks ODN.
Figure 5B:
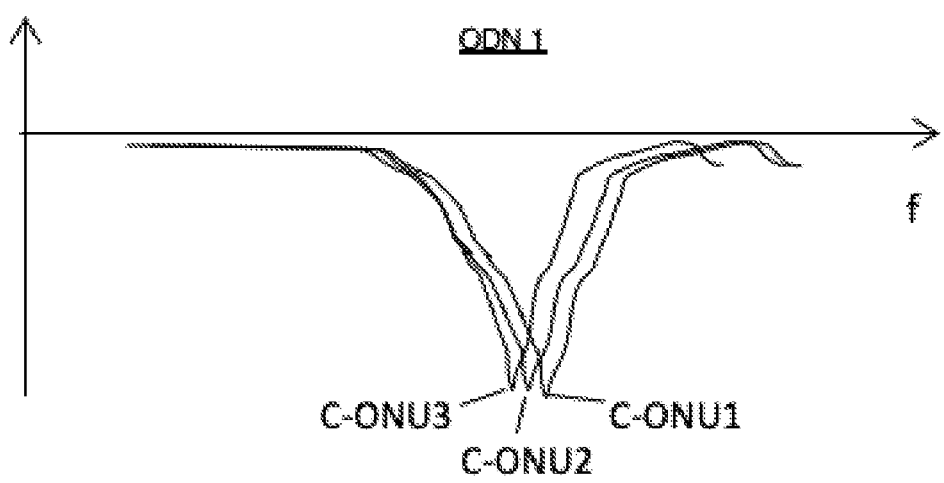
FIG. 5B illustrates fading curves of optical channels included in the first network ODN of FIG. 5A.
Figure 5C:
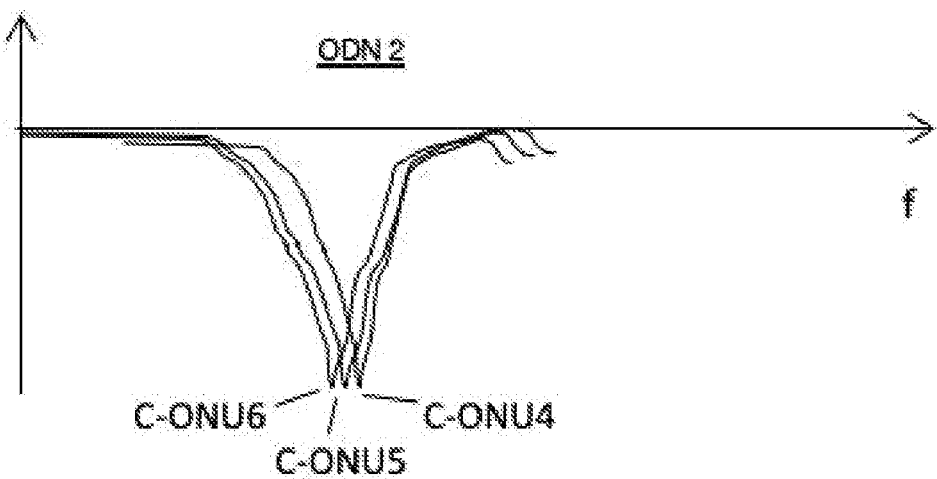
FIG. 5C illustrates fading curves of optical channels included in the second network ODN of FIG. 5A.

The general principle of the proposed solution is now summarized with reference to FIGS. 5A, 5B and 5C. FIG. 5A shows an example of a PON network comprising first and second networks ODN, referenced ODN1 and ODN2 respectively. FIG. 5B illustrates fading curves of optical channels included in the first network ODN1 of FIG. 5A (optical channels between the equipment OLT and the equipment ONU referenced ONU1, ONU2 and ONU3). FIG. 5C illustrates fading curves of optical channels included in the second network ODN2 of FIG. 5A (optical channels between the equipment OLT and the equipment ONU referenced ONU4, ONU5 and ONU6).

One could see that the curves C-ONU1, C-ONU2 and C-ONU3 of FIG. 5B (associated with the three channels each connecting the equipment OLT to one of the pieces of equipment ONU1, ONU2 and ONU3) show that their fading peaks are substantially co-located in frequency, which justifies the fact that the proposed solution carries out an equalization for these three channels.

One could also see that the curves C-ONU4, C-ONU5 and C-ONU6 of FIG. 5C (associated with the three other channels each connecting the equipment OLT to one of the pieces of equipment ONU4, ONU5 and ONU6) show that their fading peaks are also substantially co-localized in frequency, which justifies the fact that the proposed solution carries out an equalization for these three other channels, and that their fading peaks are frequency shifted with respect to those of the curves C-ONU1, C-ONU2 and C-ONU3 of FIG. 5B, which justifies the fact that the proposed solution does not carry out the same equalization for each of the two groups of three other channels.

Figure 6:
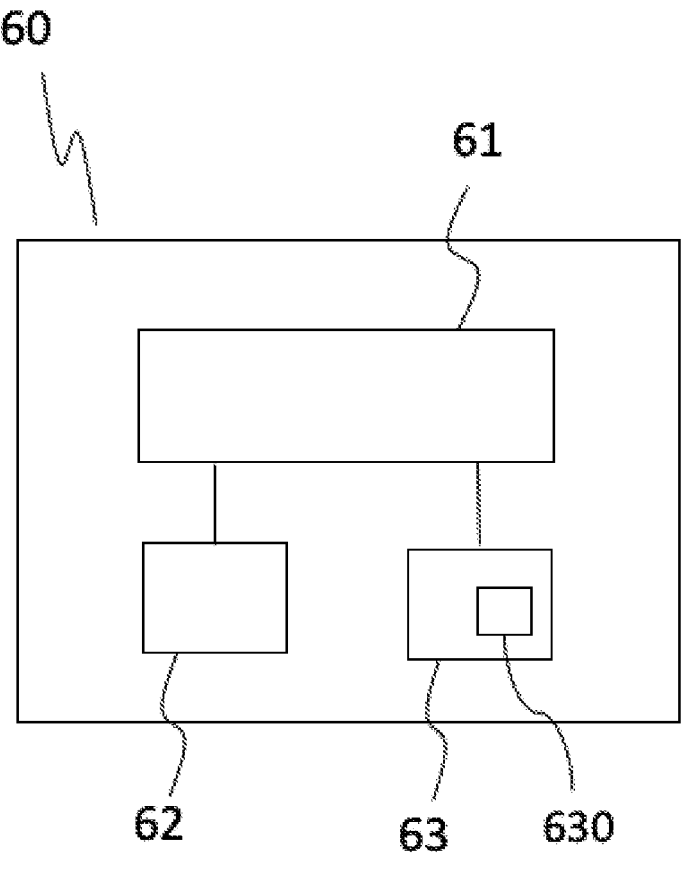
FIG. 6 shows the structure of a computing machine according to a particular embodiment of the invention, configured to implement the method of FIG. 4.

FIG. 6 shows the structure of a computing machine 60 according to a particular embodiment of the invention, configured to implement the method of FIG. 4 and which can be implemented in the equipment OLT and/or in the equipment ONU.

This structure comprises a random-access memory 62 (for example a RAM memory), a read-only memory 63 (for example a ROM memory or a hard disk) and a processing unit 61 (equipped for example with a processor, and controlled by a computer program 630 stored in the read-only memory 63). On initialization, the code instructions of the computer program 630 are for example loaded into the random-access memory 62 before being executed by the processor of the processing unit 61.

This FIG. 6 illustrates only one particular manner, among several possible ones, for implementing the method of the invention on a computing machine. Indeed, the method of the invention is implemented indifferently on a reprogrammable computing machine (a PC computer, a DSP processor or a microcontroller) executing a program comprising a sequence of instructions, or on a dedicated computing machine (for example a set of logic gates like an FPGA or an ASIC, or any other hardware module).

In the case of an implementation on a reprogrammable computing machine, the corresponding program (i.e. the sequence of instructions) could be stored in a removable storage medium (such as a floppy disk, a CD-ROM or a DVD-ROM) or not, this storage medium being partially or totally readable by a computer or a processor.

Technology Migration Between Two Pieces of Equipment OLT of Different Generations (for the Same Network ODN)

An exchange, between two generations of equipment OLT, of parameters on the optical infrastructure (network ODN) which will be shared through coexistence between the two generations of equipment OLT is proposed. For example, a G-PON or XG(S)-PON type equipment OLT will inform a HS-PON type equipment OLT of the supervision parameters (BBF TR-280) and other operating parameters, in particular: the number of connected pieces of equipment ONU;

the OLT/ONU distances (distances between the equipment OLT and each of the pieces of equipment ONU);

the temperature, the voltage, the bias current of an emitter included in one of the pieces of equipment ONU or in the equipment OLT;

the optical power emitted by an emitter included in one of the pieces of equipment ONU or in the equipment OLT;

the optical power received by a receiver included in one of the pieces of equipment ONU or in the equipment OLT;

the history of the performance monitoring of the corrector (FEC) and of the GEM ports;

. . .

All of these parameters will enable the HS-PON type equipment OLT to optimize the transmission of the physical layer for the considered network ODN (PON tree). Indeed, knowledge of the range (distance) and the optical budget for each of the clients (equipment ONU) are, for example, data that are essential for the optimization of the processing parameters of the signal, for equalization in particular. Thus, the knowledge of the statistics of all of the clients of the considered infrastructure (the considered network ODN) allows optimizing the processing of the signal to serve all clients. Indeed, a statistic within a client range centered at 5 km with a disparity of 1 km will not require the same signal intermediate device processing parameters (in particular equalization) as a statistic within a client range centered at 12 km with a disparity of 8 km.

This exchange may be occasional during the installation of the network HS-PON. This exchange may be periodic or related to an event between generations of equipment OLT. Typically, a client who disappears from a network G-PON or XG(S)-PON is potentially a client who will migrate to the network HS-PON. Otherwise, a process of toggling a client on the Network HS-PON (by "pre-provisioning") may require the HS-PON type equipment OLT to interrogate the G-PON or XG(S)-PON type equipment OLT on the operating parameters of this client before this toggling.

The exchange may be implemented as follows:

identification of the data of a PON network by a piece of equipment OLT of a first type;

local memorization of these data, for example within the equipment OLT of the first type (or of a piece of equipment located in the central office, or remote, for example within a network controller or a disjoint database);

exchange (locally or remotely) of these data via an interface between the equipment OLT of the first type and a piece of equipment OLT of a second type; and account of these data by the second type (HS-PON for example) equipment OLT in particular to optimize the physical layer connectivity of the clients.

Thus, the exchanged parameters may be used to perform, thanks to the second type (HS-PON for example) piece of equipment OLT, at least one complementary function other than equalization:

knowledge of the operating point of the different components of the transmission chain allows optimizing the performances thereof. For example, temperature is involved in the bandwidth of the laser (cf. for example: S. J. Wand, T. M. Shen and N. K. Dutta, "Temperature dependence of the bandwidth of buried heterostructure distributed feedback lasers," in IEEE Photonics Technology Letters, vol. 1, no. 9, pp. 258-260, September 1989, doi: 10.1109/68.43338);

similarly, the bias current or the modulating voltage applied to the elements affects their performances. Knowledge of the emission or reception power (Ptx/Prx) allows having a better idea of the state of the system;

pre-knowledge of configuration parameters like the GEM-ports can allow a faster migration between PON technologies (no need to configure the new technology);

in turn, knowledge of the alarm history can mean that certain useless interventions can be excluded. For example, if it has been noticed with the generation of previous equipment that the equipment of a client raises an alarm at a fixed time and that this series of alarms turns out to be harmless, after migration this knowledge can allow immediately declaring harmless the alarms generated on the new generation by the same client;

in turn, knowledge of the OLT-ONU distance can accelerate and simplify the "ranging" phase of the new-generation equipment ONU after migration (the ranging phase is the phase enabling the equipment OLT to discover equipment ONU and to estimate in particular their OLT/ONU distance in order to properly manage the allocation of "talking times" (or emission times) of the equipment ONU over time;

. . .

The invention claimed is:

1. A method for equalization in a passive optical network type access network, wherein the method comprises, for a given optical distribution network connecting a given port of an optical line termination to a given plurality of optical network units:

obtaining distances, each distance being between the optical line termination and one of the optical network units of said optical distribution network;

determining a representative distance between the optical line termination and the plurality of optical network units of the optical distribution network, according to the obtained distances;

determining at least one equalization parameter according to the representative distance of said optical distribution network; and equalizing transmission channels within the optical distribution network according to said at least one equalization parameter, each of the transmission channels connecting the given port of the optical line termination to one of the optical network units of the optical distribution network, wherein, for at least one of the plurality of optical network units of the optical distribution network, the obtaining the distance for that optical network unit results from sharing at least one transmission parameter including said distance, said at least one transmission parameter being shared between the optical line termination and another optical line termination of a different generation and also connected to said optical distribution network, wherein the sharing is performed during a migration to a new generation of optical line termination.

2. The method according to claim 1, wherein the obtaining the distance is performed for each of the optical network units of the given plurality, and the determination of the representative distance depends on the distances obtained for said optical network units of the given plurality.

3. The method according to claim 1, wherein said at least one transmission parameter further comprises at least one parameter relative to a transmission chain between the optical line termination and said optical network unit, and the determination of said at least one equalization parameter also depends on said at least one parameter relative to a transmission chain.

4. The method according to claim 3, wherein said at least one parameter relative to a transmission chain belongs to the group consisting of:

a temperature of the optical line termination or of the optical network unit;

an optical power emitted by an emitter included in the optical line termination or the optical network unit;

an optical power received by a receiver included in the optical line termination or the optical network unit;

a bias current within an emitter included in the optical line termination or the optical network unit; and a modulation voltage within an emitter included in the optical line termination or the optical network unit.

5. The method according to claim 1, wherein the method comprises memorizing in the optical line termination, or emitting towards a device capable of memorizing, said at least one transmission parameter, for another subsequent sharing.

6. The method according to claim 1, wherein the equalizing comprises at least one equalization type belonging to the group consisting of:

a pre-compensation type equalization, performed in the optical line termination and applying for a downlink direction, from the optical line termination towards the given plurality of optical network units;

a post-compensation type equalization, performed in at least one of the optical network units and applying for a downlink direction, from the optical line termination towards said optical network unit;

a pre-compensation type equalization, performed in the optical line termination and applying for an uplink direction, from one of the optical network units towards the optical line termination; and a post-compensation type equalization, performed in at least one of the optical network units and applied for an uplink direction, from said optical network unit towards the optical line termination.

7. A non-transitory computer-readable medium comprising computer program product stored thereon, comprising program code instructions which, when executed by a computing machine, cause the computing machine to implement a method for equalization in a passive optical network type access network, wherein the method comprises, for a given optical distribution network connecting a given port of an optical line termination to a given plurality of optical network units:

obtaining distances, each distance being between the optical line termination and one of the optical network units of said optical distribution network;

determining a representative distance between the optical line termination and the plurality of optical network units of the optical distribution network;

according to the obtained distances;

determining at least one equalization parameter according to the representative distance of the optical distribution network; and equalizing transmission channels within the optical distribution network, according to said at least one equalization parameter, each of the transmission channels connecting the given port of the optical line termination to one of the optical network units of said optical distribution network;

wherein, for at least one of the plurality of optical network units of the optical distribution network, the obtaining the distance for that optical network unit results from sharing at least one transmission parameter including said distance, said at least one transmission parameter being shared between the optical line termination and another optical line termination of a different generation and also connected to the optical distribution network, wherein the sharing is performed during a migration to a new generation of optical line termination.

8. An optical line termination of a passive optical network type access network, wherein the optical line termination comprises:

a processor; and a non-transitory computer readable medium comprising instructions stored thereon which when executed by the processor configure the processor to implement a method for equalization in the passive optical network type access network, wherein the method comprises, for a given optical distribution network connecting a given port of an optical line termination to a given plurality of optical network units:

obtaining distances, each distance being between the optical line termination and one of the optical network units of said optical distribution network;

determining a representative distance between the optical line termination and the plurality of optical network units of said optical distribution network according to the obtained distances;

determining at least one equalization parameter according to the representative distance of said optical distribution network; and equalizing transmission channels within the optical distribution network, according to said at least one equalization parameter, each of the transmission channels connecting the given port of the optical line termination to one of the optical network units of the optical distribution network;

wherein, for at least one of the plurality of optical network units of the optical distribution network, the obtaining the distance for that optical network unit results from sharing at least one transmission parameter including said distance, said at least one transmission parameter being shared between the optical line termination and another optical line termination of a different generation and also connected to the optical distribution network, wherein the sharing is performed during a migration to a new generation of optical line termination.

9. An optical network unit of a passive optical network type access network, wherein the optical network unit comprises:

a processor; and a non-transitory computer readable medium comprising instructions stored thereon which when executed by the processor configure the processor to implement a method comprising, for a given optical distribution network connecting a given port of an optical line termination to a given plurality of optical network units including said optical network unit:

obtaining distances, each distance being between the optical line termination and one of the optical network units of said optical distribution network;

determining a representative distance between the optical line termination and the plurality of optical network units of said optical distribution network according to the obtained distances;

determining at least one equalization parameter, according to the representative distance of said optical distribution network; and equalizing, according to said at least one equalization parameter, the transmission channel connecting the given port of the optical line termination to said optical network unit;

wherein, for at least one of the plurality of optical network units of the optical distribution network, the obtaining the distance for the optical network unit results from sharing at least one transmission parameter including said distance, said at least one transmission parameter being shared between the optical line termination and another optical line termination of a different generation and also connected to the optical distribution network, wherein the sharing is performed during a migration to a new generation of optical line termination.

* * * * *